Patented Jan. 19, 1932

1,841,637

UNITED STATES PATENT OFFICE

KENNETH HERBERT SAUNDERS AND MORDECAI MENDOZA, OF MANCHESTER, ENGLAND, ASSIGNORS TO BRITISH DYESTUFFS CORPORATION LIMITED, OF MANCHESTER, ENGLAND

AZO DYESTUFFS

No Drawing. Original application filed March 26, 1926, Serial No. 97,758, and in Great Britain July 31, 1925. Divided and this application filed December 1, 1928. Serial No. 323,198.

In our prior and copending application Ser. No. 97,758 of which the present application is a division, we describe new dyestuff intermediates and processes of making the same. These new dyestuff intermediates are amino diphenyl sulphides. They may be represented by the following general formula

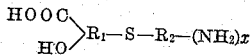

wherein $R_1$ and $R_2$ represent benzene residues which may be further substituted, $x$ is 1 or 2 and in which the COOH and the OH groups are ortho to each other. These amino diphenyl sulphides may be produced by condensing ortho-hydroxy-carboxy-phenyl-thiol-salicylic acid with nitro compounds of the benzene series which contain a labile nuclear halogen atom to produce nitro diphenyl sulphides and then reducing the said nitro diphenyl sulphides to form the amino compounds. Mono and diamino diphenyl sulphides of the type indicated above may be produced.

In our acknowledged copending application we disclose certain nitro diphenyl sulphides as typical examples of compounds from which our new sulphides may be derived by reducing the nitro group. Such typical compounds are as follows:

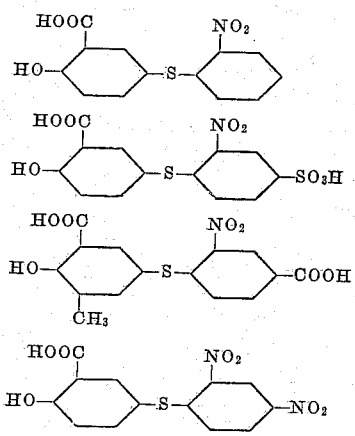

The present application relates to the azo dyestuffs derived from the general class of amino diphenyl sulphides set forth in our application Ser. No. 97,758. These new azo dyestuffs may be produced by various methods and they have various specific structural arrangements. But these dyestuffs have a general characteristic property which is advantageous. They are fixed on either animal or vegetable fibres by metallic mordants with little or no change in shade. After fixation, the dyeings become fast to soap, milling, potting, etc. All the dyestuffs within the scope of the present invention have a certain characteristic structural arrangement. In these new azo dyes the chromophore group is separated from and united to the chelate group, in this instance the

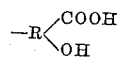

group by a sulphide bridge. It is to such a structural arrangement that we mainly attribute the property of these dyestuffs of giving dyeings remaining practically or substantially unchanged in shade when chromed. Our new dyestuffs may be represented by the generic formula

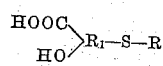

wherein $R_1$ represents a benzene residue and R represents a residue having an azo group attached thereto, the grouping represented by R possessing chromophoric properties; and in which the OH and COOH groups are ortho to each other.

Such azo dyes may be made by various processes. The monoamino sulphides may be used as first components, that is, they may be diazotized and coupled with the usual azo dye coupling components. The diamino sulphides may be used as second components, that is, they may be coupled with diazo compounds. Further the diamine may be partially acylated and the remaining amino group diazotized and coupled with a second component. We find that the monoazo dyes are especially advantageous. These monoazo dyes may be represented by the following general formula

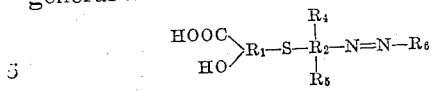

wherein $R_1$ and $R_2$ represent benzene residues which may be further substituted and in which the COOH and OH groups are ortho to each other, $R_4$ represents hydrogen, an amino group, a sulphonic group, a carboxyl group or acylated amino group, $R_5$ represents hydrogen or an amino group and $R_6$ represents the coupled residue of an azo dye component. By the term "coupled residue of an azo dye component" we mean the coupled residue from an azo dye coupling component or from a diazotized coupling component.

However, the production of polyazo dyes is also within the scope of the present invention. Polyazo dyes may be built up in any suitable manner, for instance, any of the following general processes may be used. (1) A diamino diphenyl sulphide may be coupled with tetrazotized benzidine or other suitable diamine. The dyes so produced may be represented by the general formula

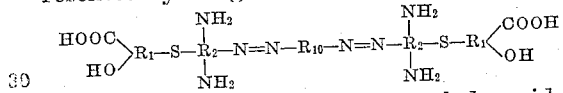

wherein $R_{10}$ represents a coupled residue from a tetrazotized diamine, such as one of the following structures:

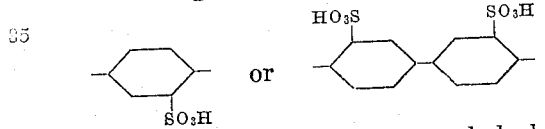

and in which the remaining symbols have designations as given ante. (2) A monoamino diphenyl sulphide may be diazotized and coupled with a suitable amine or derivative thereof such as paraxylidine, cresidine, alpha-naphthylamine or methyl-omega-sulphonate and the resulting dyestuff diazotized and coupled again thus building up straight chain azo dyestuffs in the well-known manner. Such dyestuffs may be represented by the general formula

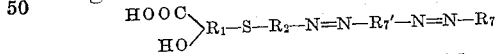

wherein $R_7'$ represents the residue of an amino azo dye component which has been coupled, diazotized and recoupled and $R_7$ represents a coupled residue of an azo dye coupling component. (3) A monoamino sulphide may be diazotized and coupled with a component capable of coupling a second time under different conditions with a second diazo compound. These disazo dyes may be represented by the general formula

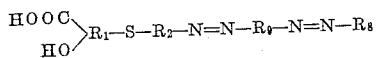

wherein $R_9$ represents a divalent residue of an azo dye component and $R_8$ represents the residue of a diazotized coupling component. (4) A nitro-amine may be diazotized and coupled, for instance, to a diamino diphenyl sulphide, and after coupling, one or more nitro groups may be reduced, the monoazo dyestuff rediazotized and coupled a second time with another component. The dyestuff so produced may be represented by the general formula

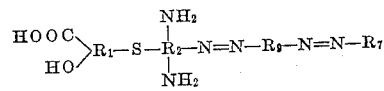

wherein $R_9$ represents a divalent residue of an azo dye component and $R_7$ represents a coupled residue from an azo dye coupling component. Monoazo and polyazo dyestuffs may be produced at will. Monoazo dyestuffs may be produced which are converted into dis- or polyazo dyestuffs.

The above classes of dyestuffs falling within the purview of our invention can all be represented by the general formula

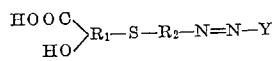

wherein $R_1$ and $R_2$ represent benzene residues which may be further substituted and in which the OH and the COOH groups are ortho to each other, and Y represents $R_6$ or $-R_9-N=N-R_6$, $-R_9-N=N-R_7$, $-R_9-N=N-R_8$, $-R_7'-N=N-R_7$, or $-R_{10}-N=N-R_7$, wherein $R_6$ represents the coupled residue of an azo dye component, $R_7$ represents the residue of an azo dye coupling component, $R_7'$ represents the residue of an amino azo dye coupling component which has been coupled, diazotized and recoupled, $R_8$ represents the residue of a diazotized coupling component, $R_9$ represents a divalent residue of an azo dye component and $R_{10}$ represents a coupled residue from a tetrazotized diamine or one of the structures

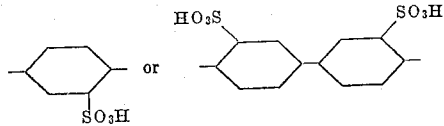

The above description sets forth the broad scope of our invention. The following examples are merely illustrative of our broad invention and in no way limit the same. The parts are given by weight.

*Example 1.*—10 parts of the amino sulphide obtained by reacting 5-thiol-salicylic acid with 4-chloro-3-nitrobenzene sodium sulphonate and subsequently reducing the resulting nitro-sulphide (for instance, with iron and hydrochloric acid) are dissolved in water with 3 parts of sodium carbonate and 1.96 parts of sodium nitrite. The whole is allowed to flow down into a stirred, well-cooled mineral acid, when diazotization takes place. The diazo compound is then added to a solution of 4.1 parts of β-naphthol dissolved in caustic soda in the presence of sodium carbonate. Coupling occurs rapidly and when complete the orange dyestuff is salted from solution, filtered off and dried. The dyestuff has in the form of the free acid the probable formula

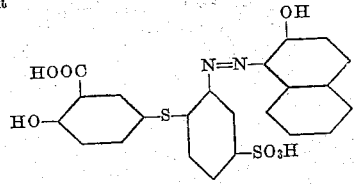

It dyes wool orange and becomes fast to milling and potting when chromed. Printed on cotton with a chrome mordant, it yields orange shades fast to warm soap and chlorine. Instead of β-naphthol there may be mentioned as alternative second components acetyl H acid (bluish-red), 2′:5′-dichloroacetyl H acid (bluish-red), 2′:5′-dichloro- (golden yellow), gamma acid, acid coupling, (red), or Schaeffer acid (reddish-orange), and the like.

*Example 2.*—23 parts of p-nitraniline-o-sulphonic acid (sodium salt) are dissolved in 500 parts of water and added to 35 parts of hydrochloric acid (36 percent) diluted with 250 parts of water. After cooling to about 5° C. a solution of 6.9 parts of sodium nitrite in 40 parts of water is slowly added. When diazotization is complete the product is slowly run into a stirred solution of 27.6 parts of the diamine obtained by reduction of the dinitro-sulphide derived from 5-thiolsalicylic acid and 2:4-dinitrochlorobenzene. The diamine is held in solution with 5.5 parts of soda ash and 50 parts of sodium bicarbonate are added to the solution.

When coupling is complete the dyestuff is salted out after making the solution neutral with hydrochloric acid. The precipitated dyestuff is filtered off, dried and ground. The dyestuff has in the form of the free acid the probable formula

Cotton cloth is printed in red-violet shades when fixed with a chrome mordant. The shades are fast to warm soap.

Instead of p-nitraniline-o-sulphonic acid, there may be used as first component naphthionic acid (red brown) or 2:5-dichloroaniline (light red-brown).

*Example 3.*—A batch of dyestuff is prepared as in the preceding example. When coupling is complete the product is allowed to warm up to room temperature and is reduced in about 4 hours by a solution of 40 parts of crystallized sodium sulphide dissolved in 60 parts of water. The mixture is then made neutral by means of hydrochloric acid and a further 35 parts of hydrochloric acid (36 percent) are then added. The whole is then cooled to about 5° C. or less and diazotized with 6.9 parts of sodium nitrite. When diazotization is complete 27.6 parts of the same diamino-sulphide used in the preceding example is dissolved in 500 parts of water containing 36 parts of soda ash. When coupling is complete the dyestuff is isolated by salting, filtering and drying. The dyestuff has in the form of the free acid the probable formula

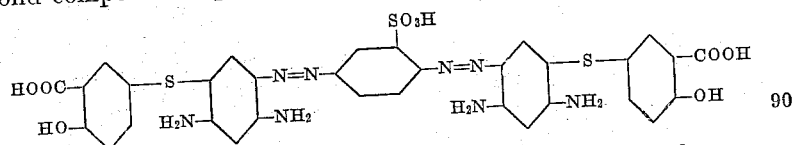

Cotton cloth is printed with a chrome mordant in violet shades fast to warm soap.

If acetyl H acid is used as the final component instead of the diamino-sulphide, the resulting dyestuff prints cotton with a chrome mordant in greenish-blue shades.

*Example 4.*—38.8 parts of benzidine-m-disulphonic acid (sodium salt) are dissolved in 500 parts of water cooled to 10° C. and 13.8 parts of sodium nitrite added. The mixture is run into 70 parts of hydrochloric acid (36 percent) diluted with 250 parts of water. During tetrazotization the mixture is kept at 10° C.

When tetrazotization is complete the product is added to a solution of 55.2 parts of the diamino-sulphide mentioned in Example 2, dissolved in 1000 parts of water containing 60 parts of soda ash. On completion of coupling, the dyestuff is salted out, filtered off and dried. The dyestuff has in the form of the free acid the probable formula

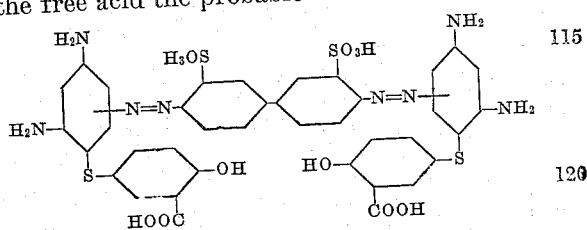

Cotton cloth is printed with a chrome mordant in yellowish-brown shades fast to warm soap.

What we claim and desire to secure by Letters Patent is:—

1. Azo dyes carrying a chelate group and adapted for mordant dyeing with the chelate group separated from and connected to the chromophore group by a sulphide bridge, said azo dyes being mixed sulphides having the probable formula

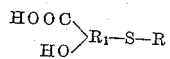

wherein $R_1$ represents a benzene residue and R represents a benzene residue having an azo group attached thereto, the grouping represented by R possessing chromophoric properties; and in which the COOH and OH groups are ortho to each other, the said dyes producing shades which are substantially unchanged when chromed.

2. Azo dyes carrying a chelate group and adapted for mordant dyeing with the chelate group separated from and connected to the chromophore group by a sulphide bridge, said dyes being mixed sulphides having the probable formula

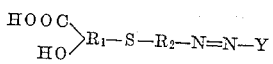

wherein $R_1$ and $R_2$ represent benzene residues in which the OH and the COOH groups are ortho to each other, and Y represents $R_6$, $-R_9-N=N-R_6$, $-R_9-N=N-R_7$, $-R_9-N=N-R_8$, $-R_7'-N=N-R_7$, $-R_7'-N=N-R_8$ or $-R_{10}-N=N-R_7$, wherein $R_6$ represents the coupled residue of an azo dye component, $R_7$ represents the residue of an azo dye coupling component, $R_7'$ represents the residue of an amino azo dye coupling component which has been coupled, diazotized and recoupled, $R_8$ represents the residue of a diazotized coupling component, $R_9$ represents a divalent residue of an azo dye component and $R_{10}$ represents a coupled residue from a tetrazotized diamine or one of the structures

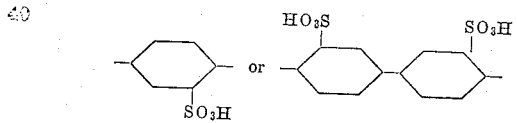

3. Azo dyes carrying a chelate group and adapted for mordant dyeing with the chelate group separated from and connected to the chromophore group by a sulphide bridge, said azo dyes being mixed sulphides having the probable formula

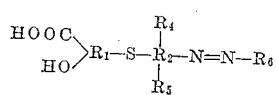

wherein $R_1$ and $R_2$ represent benzene residues in which the COOH and OH groups are ortho to each other, $R_4$ represents hydrogen, a carboxyl group, a sulphonic group, an amino group or an acylated amino group, $R_5$ represents hydrogen or an amino group and $R_6$ represents the coupled residue of an azo dye component, the said dyes producing shades which are substantially unchanged when chromed.

4. Azo dyes carrying a chelate group and adapted for mordant dyeing with the chelate group separated from and connected to the chromophore group by a sulphide bridge, said azo dyes being mixed sulphides having the probable formula

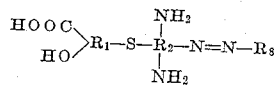

wherein $R_1$ and $R_2$ represent benzene residues, $R_8$ represents a coupled residue of a diazotized coupling component; and in which the OH and COOH groups are ortho to each other and the OH group is para to the sulphide bridge, the said dyes producing shades which are substantially unchanged when chromed.

5. An azo dye carrying a chelate group and adapted for mordant dyeing with the chelate group separated from and connected to the chromophore group by a sulphide bridge, said azo dye being a mixed sulphide having the probable formula

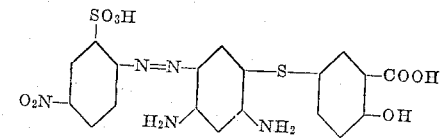

said dye being soluble in water and giving red-violet shades on cotton when fixed with a chrome mordant.

6. Azo dyes carrying a chelate group and adapted for mordant dyeing with the chelate group separated from and connected to the chromophore group by a sulphide bridge, said azo dyes being mixed sulphides having the probable formula

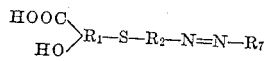

wherein $R_1$ and $R_2$ represent benzene residues, $R_7$ represents a coupled residue from an azo dye coupling component; and in which the OH and COOH groups are ortho to each other and the OH group is para to the sulphide bridge, the said dyes producing shades which are substantially unchanged when chromed.

7. Azo dyes carrying a chelate group and adapted for mordant dyeing with the chelate group separated from and connected to the chromophore group by a sulphide bridge, said azo dyes being mixed sulphides having the probable formula

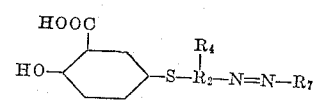

wherein $R_2$ represents a benzene residue, $R_4$ represents hydrogen, a carboxyl group, a sulphonic group or an acylated amino group, and $R_7$ represents a coupled residue from an azo dye coupling component; and in which the COOH and the OH groups are ortho to each other, the said dyes producing shades which are substantially unchanged when chromed.

8. An azo dye carrying a chelate group and adapted for mordant dyeing with the chelate group separated from and connected to the chromophore group by a sulphide bridge, said azo dye being a mixed sulphide having the probable formula

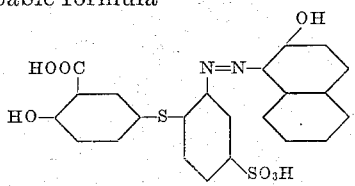

the said dye being an orange colored powder and dyeing wool in orange shades which are substantially unchanged when chromed and which when chromed are fast to milling and potting.

9. Azo dyes carrying a chelate group and adapted for mordant dyeing with the chelate group separated from and connected to the chromophore group by a sulphide bridge, said azo dyes being mixed sulphides having the probable formula

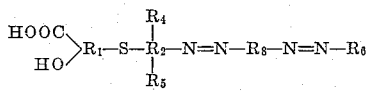

wherein $R_1$ and $R_2$ represent benzene residues in which the OH and the COOH groups are ortho to each other and the OH group is para to the sulphide bridge, $R_4$ represents hydrogen, a carboxyl group, a sulphonic group, an amino group or an acylated amino group, $R_5$ represents hydrogen or an amino group, $R_9$ represents a divalent residue of an azo dye component and $R_6$ represents the coupled residue of an azo dye component.

10. Azo dyes carrying a chelate group and adapted for mordant dyeing with the chelate group separated from and connected to the chromophore group by a sulphide bridge, said azo dyes being mixed sulphides having the probable formula

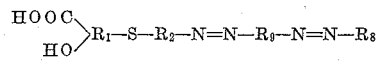

wherein $R_1$ and $R_2$ represent benzene residues, $R_9$ represents a divalent residue of an azo dye component and $R_8$ represents the residue of a diazotized coupling component; and in which the OH and COOH groups are ortho to each other and the OH group is para to the sulphide bridge, the said dyes producing shades which are substantially unchanged when chromed.

11. Azo dyes carrying a chelate group and adapted for mordant dyeing with the chelate group separated from and connected to the chromophore group by a sulphide bridge, said azo dyes being mixed sulphides having the probable formula

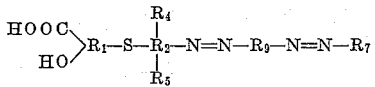

wherein $R_1$ and $R_2$ represent benzene residues, $R_4$ represents hydrogen, a carboxyl group, a sulphonic group, an amino group or an acylated amino group, $R_5$ represents hydrogen or an amino group, $R_9$ represents a divalent residue of an azo dye component and $R_7$ represents a coupled residue from an azo dye coupling component; and in which the OH and COOH groups are ortho to each other and the OH group is para to the sulphide bridge, the said dyes producing shades which are substantially unchanged when chromed.

12. Azo dyes carrying a chelate group and adapted for mordant dyeing with the chelate group separated from and connected to the chromophore group by a sulphide bridge, said azo dyes being mixed sulphides having the probable formula

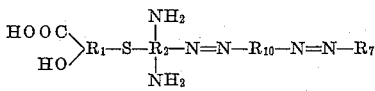

wherein $R_1$ and $R_2$ represent benzene residues in which the OH and the COOH groups are ortho to each other and the OH group is para to the sulphide bridge, $R_{10}$ represents the residue of a tetrazotized diamine, or one of the structures.

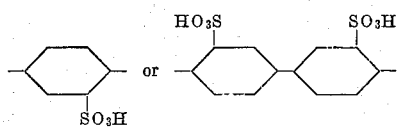

and $R_7$ represents the coupled residue of an azo dye coupling component.

13. The product of claim 12 wherein $R_7$ represents the residue of a coupled diamino diphenyl sulphide.

14. An azo dye carrying a chelate group and adapted for mordant dyeing with the chelate group separated from and connected to the chromophore group by a sulphide bridge, said azo dye being a mixed sulphide having the probable formula

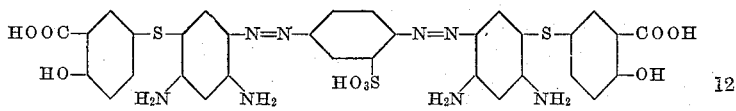

said azo dye being soluble in water and giving violet shades on cotton cloth when fixed with a chrome mordant, said shades being fast to warm soap solutions.

In witness whereof we affix our signatures.

KENNETH HERBERT SAUNDERS.
MORDECAI MENDOZA.

Certificate of Correction

Patent No. 1,841,637.                                                  Granted January 19, 1932, to

KENNETH HERBERT SAUNDERS ET AL.

It is hereby certified that error appears in the printed specification of the above-numbered patent requiring correction as follows: Page 3, line 28, strike out the words " of soda ash and 50 parts of sodium bicarbon- " and insert instead *phenyl-3-methyl-5-pyrazolone sulphonic acid;* page 5, lines 27 to 29, claim 9, strike out the formula and insert the following—

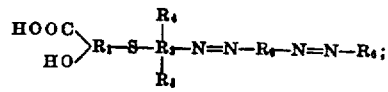

same page, line 100, claim 12, strike out the *period* after " structures "; and that the said Letters Patent should be read with these corrections therein that the same may conform to the record of the case in the Patent Office.

Signed and sealed this 1st day of March, A. D. 1932.

[SEAL.]                                                                         M. J. MOORE,
*Acting Commissioner of Patents.*